United States Patent
Mulihano

(10) Patent No.: US 10,681,223 B1
(45) Date of Patent: Jun. 9, 2020

(54) SYSTEM AND METHOD FOR PROVIDING AIRTIME-ON-CREDIT SERVICES

(71) Applicant: ComzAfrica Limited, Ebène (MU)

(72) Inventor: Gilles Richard Mulihano, Kigali (RW)

(73) Assignee: ComzAfrica Limited, Ebène (MU)

( * ) Notice: Subject to any disclaimer, the term of this patent is extended or adjusted under 35 U.S.C. 154(b) by 0 days.

(21) Appl. No.: 16/427,798

(22) Filed: May 31, 2019

(51) Int. Cl.
*H04M 15/00* (2006.01)
*G06Q 20/14* (2012.01)

(52) U.S. Cl.
CPC ........ *H04M 15/705* (2013.01); *G06Q 20/145* (2013.01); *H04M 15/41* (2013.01); *H04M 15/60* (2013.01); *H04M 15/66* (2013.01); *H04M 15/852* (2013.01)

(58) Field of Classification Search
CPC ....... H04W 4/24; H04W 4/00; H04M 17/204; H04M 15/68; H04M 17/20; H04M 15/705; H04M 15/66; H04M 15/41; H04M 15/852; H04M 15/60; G06Q 20/16; G06Q 40/025; G06Q 20/145
See application file for complete search history.

(56) References Cited

U.S. PATENT DOCUMENTS

| | | | | |
|---|---|---|---|---|
| 5,557,516 A * | 9/1996 | Hogan | ................. | G06Q 20/105 705/41 |
| 2009/0089205 A1* | 4/2009 | Bayne | ................ | G06Q 20/1085 705/38 |
| 2010/0075630 A1* | 3/2010 | Tillitt | ..................... | H04W 4/24 455/406 |
| 2011/0145086 A1* | 6/2011 | Valdes | .................. | G06Q 20/10 705/26.1 |
| 2014/0279388 A1* | 9/2014 | Kinyua | ................ | G06Q 40/025 705/38 |

FOREIGN PATENT DOCUMENTS

EP        2184708 A2 *   5/2010  ............ G06Q 20/16

\* cited by examiner

*Primary Examiner* — Daniel Lai
(74) *Attorney, Agent, or Firm* — Foley Hoag LLP; Rajesh Vallabh

(57) ABSTRACT

According to an aspect of the present disclosure, there is provided a charging system for charging an airtime use account file associated with a user for the provision of mobile telecommunications services to the user. The charging system comprises: one or more data stores configured to store: the airtime use account file, the airtime use account file having an airtime account balance which is debited in correspondence with use of airtime services by the user and has an associated predefined balance threshold; and a dedicated account file associated with the user and configured to store loan funds provided to the user, the dedicated account file having a dedicated account balance which is debited in correspondence with use of payment services or airtime services by the user. The charging system further comprises a rules engine processor programmed with instructions which when executed cause the rules engine processor to increase the dedicated account balance in the dedicated account file by an amount corresponding to a requested loan amount, and decrease the airtime account balance of the airtime use account file by at least the requested loan amount. The rules engine processor is configured to debit the dedicated account balance with use of airtime services when the airtime account balance is at or below the threshold amount.

18 Claims, 6 Drawing Sheets

SYSTEM AND METHOD FOR PROVIDING AIRTIME-ON-CREDIT SERVICES

TECHNICAL FIELD

The present invention relates to systems and methods for providing improved communication services, and especially for providing an improved airtime-on-credit service mechanism. More specifically, though not exclusively, the present invention relates to charging system for charging an airtime use account file associated with a user for the provision of mobile telecommunications services to the user.

BACKGROUND

Payment for mobile phone services, and in particular for services requiring "airtime credit", such as text messaging and voice calls, can be generally divided into two main categories: (a) payment on a subscription basis in which the user pays a certain amount (typically on a monthly basis) and receives a set amount of airtime credit in their airtime account in return; and (b) payment on an on-demand "pay-as-you-go" basis, where the user can pay to lop-up' or 'recharge' the airtime credit in their account as and when necessary.

Mobile phones are becoming increasingly common across the world, and the on-demand option is especially prevalent in rural communities. However, airtime distribution channels are not necessarily available all of the time, particularly in rural areas. In addition, sometimes customers may need to urgently make use of airtime services but (for one reason or another) have insufficient airtime credit in their account to do so. In such cases, an "airtime-on-credit" service can be offered to customers. This service involves provision of an airtime loan to the customer, where airtime credit is placed in the customer's account for subsequent use as usual. When the customer purchases a top-up/recharge amount at a later time, some or all of this amount can then be used for loan settlement and is allocated to recovery of the loan amount.

The process of obtaining (and using) the loaned airtime credit, as well as the subsequent loan recovery process have certain considerations and challenges associated with them, in order to provide optimal accessibility for customers to the desired airtime services, as well as for efficient recovery of the loaned credit.

It is desired to improve the above-described processing relating to provision of "airtime-on-credit" services.

SUMMARY OF THE DISCLOSURE

According to an aspect of the present disclosure, there is provided a charging system for charging an airtime use account file associated with a user for the provision of mobile telecommunications services to the user. The charging system comprises: one or more data stores configured to store: the airtime use account file, the airtime use account file having an airtime account balance which is debited in correspondence with use of airtime services by the user and has an associated predefined balance threshold; and a dedicated account file associated with the user and configured to store loan funds provided to the user, the dedicated account file having a dedicated account balance which is debited in correspondence with use of payment services or airtime services by the user. The charging system further comprises a rules engine processor programmed with instructions which when executed cause the rules engine processor to increase the dedicated account balance in the dedicated account file by an amount corresponding to a requested loan amount, and decrease the airtime account balance of the airtime use account file by at least the requested loan amount. The rules engine processor is configured to debit the dedicated account balance with use of airtime services when the airtime account balance is at or below the threshold amount.

The above-described configuration comprising separate dedicated and airtime use account files is advantageous as it separates the loan repayment functionality from the use of the provided funds for airtime-on-credit service. Specifically, the system provides one (dedicated) account to store the loan funds; the user is then able to access the loan funds in this dedicated account and use them to pay for airtime services as desired. In addition, the separate (airtime) account is used by the system to track the loan repayment progress by the user; the user does not access their loan funds from this airtime account.

Furthermore, this account separation configuration can be used to instantaneously and automatically pay off some/all of a loan when the user purchases a recharge/top-up amount, without giving the user the chance to use this recharge amount for airtime services, by directing the recharge amount to the airtime use account as soon as it is provided to the system. This also reduces the amount of communications and data that need to be exchanged throughout components of the system, as well as the associated analysis and processing load.

According to another aspect of the disclosure, there is provided a computer-implemented method of charging an airtime use account file associated with a user for the provision of mobile telecommunications services to the user. The method may be implemented by a charging system comprising one or more data stores configured to store: the airtime use account file, the airtime use account file having an airtime account balance which is debited in correspondence with use of airtime services by the user and has an associated predefined balance threshold; and a dedicated account file associated with the user and configured to store loan funds provided to the user, the dedicated account file having a dedicated account balance which is debited in correspondence with use of payment services or airtime services by the user. The method comprises: increasing the dedicated account balance in the dedicated account file by an amount corresponding to a requested loan amount; and decreasing the airtime account balance of the airtime use account file by at least the requested loan amount, the method further comprising, when the airtime use account file balance is at or below the balance threshold, debiting the dedicated account balance with use of airtime services by the user.

BRIEF DESCRIPTION OF THE DRAWINGS

One or more embodiments of the invention will now be described, by way of example only, with reference to the accompanying drawings, in which.

Figure 1:
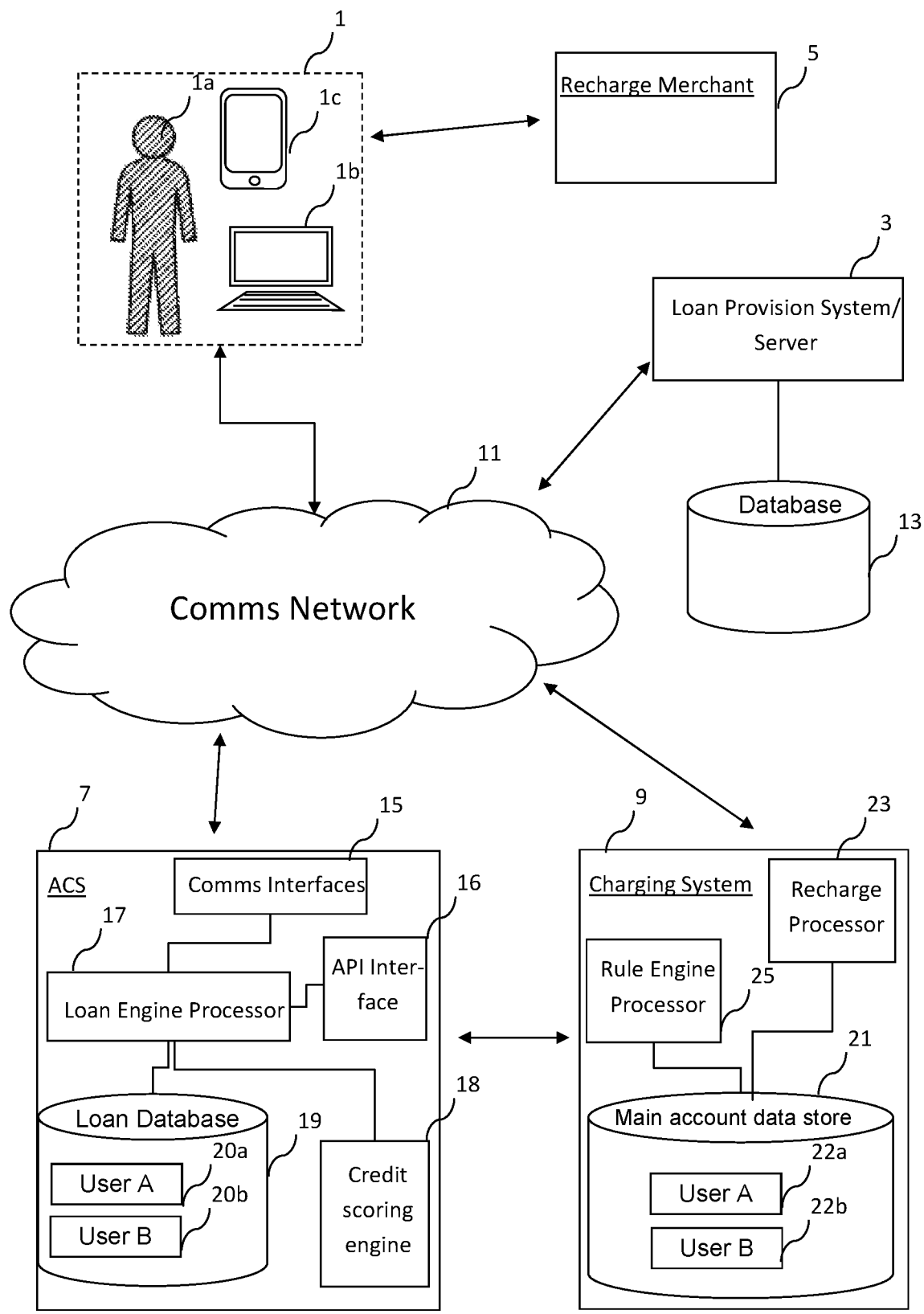
FIG. 1 is a schematic block diagram showing a known system for providing an Airtime-on-Credit service.

Where the figures laid out herein illustrate embodiments of the present invention, these should not be construed as limiting to the scope of the invention. Where appropriate, like reference numerals will be used in different figures to relate to the same structural features of the illustrated embodiments.

DETAILED DESCRIPTION

As used herein, the term "database" or "data store" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

The systems and processes are not limited to the specific embodiments described herein. In addition, components of each system and each process can be practiced independent and separate from other components and processes described herein. Each component and process also can be used in combination with other assembly packages and processes.

The following description sets out specific non-limiting embodiments of the present invention.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 2:
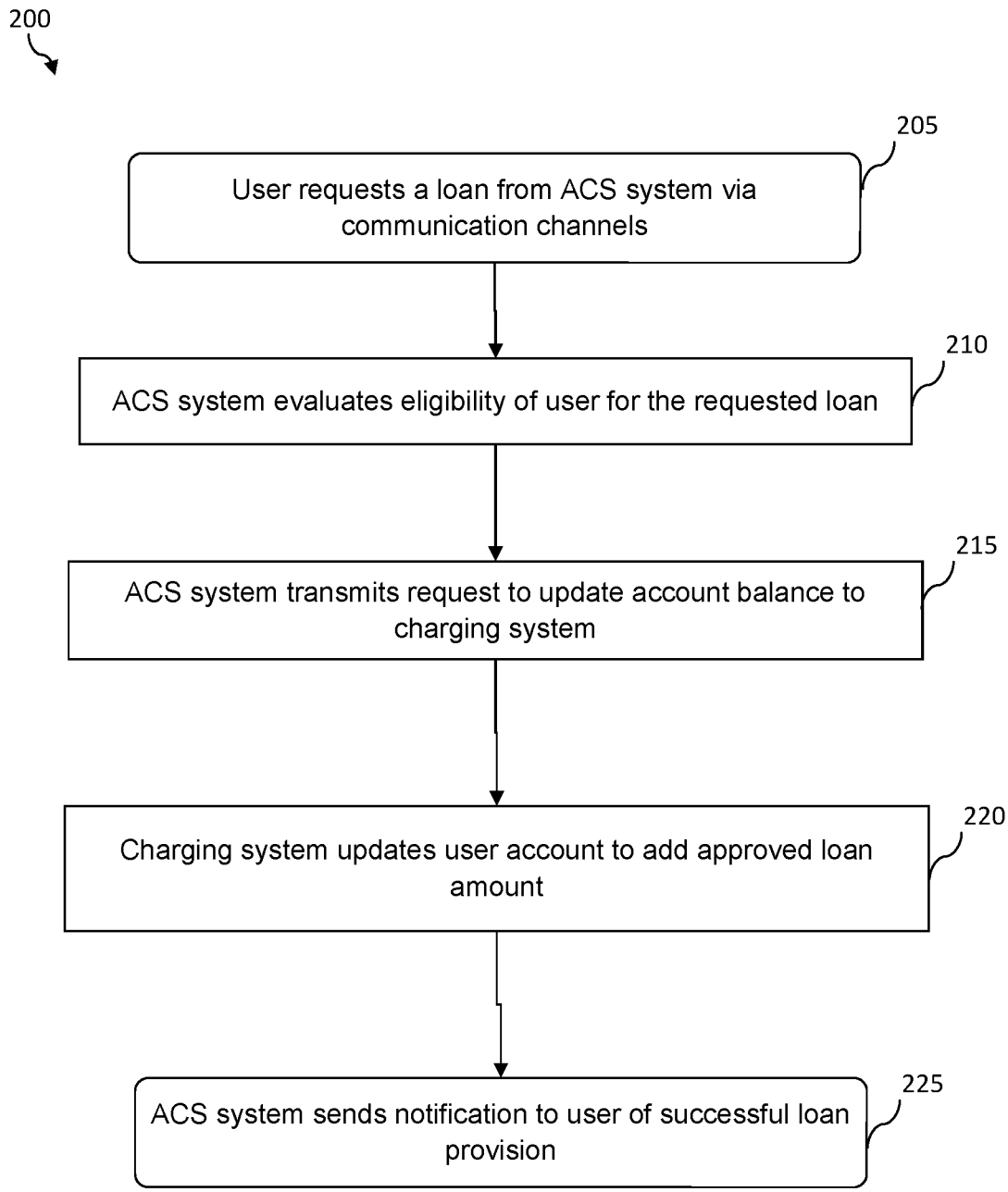
FIG. 2 is a flowchart illustrating a method for providing a loan to a requesting user using the system of FIG. 1.
Figure 3:
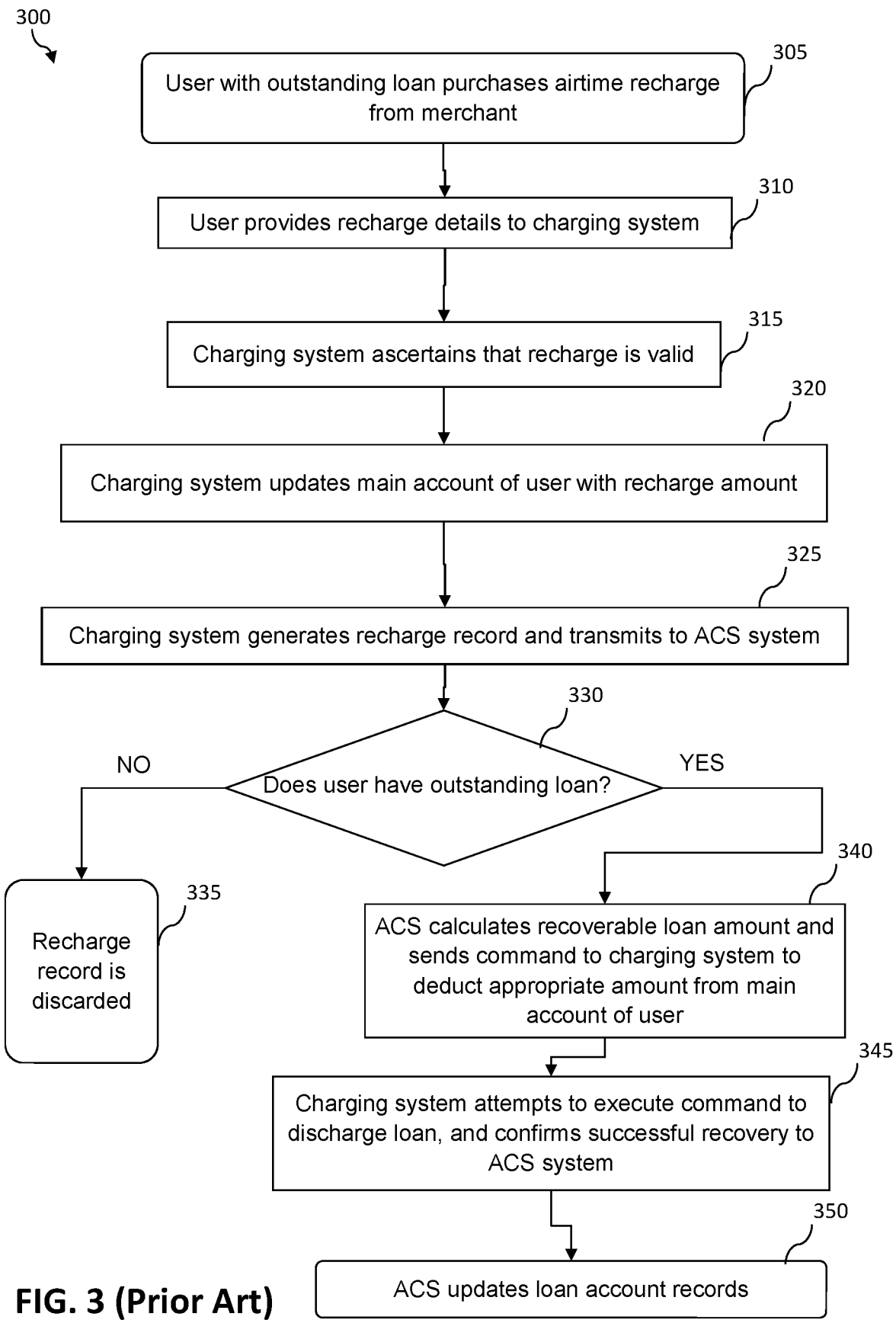
FIG. 3 is a flowchart illustrating a method for loan recovery using the system of FIG. 1.

In order to place the invention in context, a description of a conventional airtime-on-credit service system and the loan provision and recovery processes carried out by this system will now be provided with reference to FIGS. 1 to 3.

FIG. 1 illustrates an example of a conventional system that may be used to provide "airtime-on-credit" services, and in particular to facilitate provision of loans to customers requiring airtime credit, as well as to process the recovery of these loans. The system comprises various entities including a user 1, a loan provision system/server 3, a recharge merchant 5, an Airtime-on-Credit service (ACS) system 7 and a charging system 9. A wide-area communications network 11 is also provided via which the various entities (devices of the entities) may communicate with one another; whilst this is shown as a single network entity, it will be appreciated that the communications network 11 may in fact comprise multiple different communications networks which may be handled by different providers (e.g. mobile phone network, public internet etc.).

The term 'user' 1 is collectively used to refer to a customer 1a who makes use of the airtime-on-credit services, as well as the mobile telecommunications devices 1b, 1c (e.g. laptop, mobile phone, display device etc.) associated with that customer 1a and used to communicate with other entities in the networked system when accessing various services as desired.

The loan provision system (or server) 3 corresponds to a system of a financial/banking institution or entity that (ultimately) provides requested loan funds. The loan provision system 3 comprises an associated database 13 containing user records (not shown), each of which relate to a particular customer's 1a loan history and profile (for example, past loans that the customer 1a has requested and which have been granted, the repayment history of that customer). These records can be used to keep track of the loans that a particular customer 1a has requested previously, and to determine whether to grant subsequent loan requests.

The recharge merchant 5 corresponds to a system of an entity from which the user 1 purchases an airtime 'recharge' (top-up) amount. The purchased recharge amount is allocated to the user's airtime account (also referred to as the 'airtime use account file') as credit for airtime service use, and may also be used to settle any outstanding loans that the user currently has. The recharge merchant 5 can be an on-line entity or a retail outlet for example.

The ACS system 7 and the charging system 9 work together to facilitate the user's access to airtime credit, and thereby ensure that the user can make use of airtime services as desired. In particular, the ACS system 7 comprises a communications interface 15 to enable communication between entities and more specifically to enable communication data to be exchanged between the ACS system 7 and the other entities in the networked system (in particular, the user 1, the loan provision system 3 and the charging system 9). Whilst the communications interface 15 in FIG. 1 is illustrated as a single component block for ease of reference, it will be appreciated that in practice this communications interface 15 may actually comprise multiple different communications channels or interfaces that are implemented in parallel to support various communications protocols and mechanisms. For example, in various embodiments interfaces for supporting one or more of the following messaging channels are provided: SMS (Short Message Service), USSD (Unstructured Supplementary Service Data), IVR (Interactive Voice Response), or web/internet interfaces (e.g. via a web browser). In addition, the ACS system 7 comprises one or more API interfaces 16 that allows communication between the ACS system 7 and the user 1 (via applications provided on their mobile telecommunications devices 1b, 1c); or between the ACS system 7 and the loan provision system 3 (via various software packages).

The ACS system 7 also comprises a loan engine processor 17 for processing of loan provision or loan recovery, in conjunction with the loan provision system 3 and charging system 9, as will be described subsequently. This allows the user's airtime account balance (level of resources present in the account file stored in the charging system 9) to be updated as appropriate following a successful loan request or recharge. The ACS system 7 also comprises a dynamic credit scoring engine 18 that may be used during the loan provision process to ascertain the eligibility of a user for a particular requested loan amount. The loan engine processor 17 is operatively coupled to a loan database 19 provided in the ACS system 7, which contains user accounts 20*a*, 20*b* in which details of each user's loans are stored; these can be accessed by the loan engine processor 17. Although the loan provision system 3 is shown in FIG. 1 as a separate entity from the APS system 7, in certain embodiments the ACS system 7 may instead comprise a backend service (not shown) that is associated with a direct connection to the loan provision system 3. In other words, the ACS system 7 may function as a common platform that allows user interaction with the loan provision system 3; similar backend services may also be provided for other associated services such as the charging system 9. Alternatively, in other embodiments, the ACS system 7 may comprise an embedded loan provision system (not shown) that performs similar functionality to that provided by the loan provision system 3, without requiring communication over the communications network 11.

The charging system 9 comprises a main account data store 21, which contains user accounts 22*a*, 22*b* in which details of each user's 'main airtime account'—i.e. the account to and from which the user's airtime is credited/debited, and also referred to subsequently herein as the 'airtime use account', or the 'airtime use account file'—are stored; the balance of each these user accounts 22*a*, 22*b* is updated accordingly following successful loan requests and recharges by the corresponding user 1. The charging system also comprises a recharge processor 23 and a rule engine processor 25 via which the charging system 9 carries out the various processes involved in updating of airtime credit in the user's account 22*a*, 22*b*, and thereby enables the provision of airtime services. These processes include: (a) a loan provision process in which an approved amount of loan airtime funds are credited to the user's main account; (b) a recharge process in which a top-up amount of funds is credited to the user's main account; and (c) a loan recovery process in which the loan amount of funds is debited from the user's account. Some of these processes may be carried out by the charging system 9 in response to commands received from the ACS system 7.

A more detailed description of the loan provision and loan recovery processes will now be provided with reference to FIGS. 2 and 3 respectively.

The loan provision process 200 of FIG. 2 is carried out using the system of FIG. 1 and begins, at Step 205, with the customer 1*a* requesting a loan from the ACS system 7, via communications network 11 and using one of their associated mobile telecommunications devices 1*b*, 1*c*. The request can be made in various different ways including sending a message to the ACS requesting the loan (via, for example, an SMS or other messaging service such as Whatsapp), or accessing a website where a request can be made or even via a dedicated app provided on the user's smartphone 1*c*. A check is then performed, at Step 210, by the ACS system 7 to determine if the customer 1*a* is eligible for the requested loan. For example, the ACS system 7 may access the user's account in the loan database 19, and/or contact the loan provision system 3 to obtain information from the associated database 13 regarding the user's eligibility for the requested loan (e.g. taking into account the user's loan repayment history, credit rating etc.) and/or even run its own credit check using the credit scoring engine 18 on the user for the purposes of the loan. Examples of criteria that are used to determine the user's eligibility for a loan include: the average revenue per user (ARPU); the number of days since the date of activation of the user's account; the user's airtime recharge frequency; number and frequency of airtime loan requests and details of loan repayment associated with the user; and average loan repayment time of the user.

If the user is deemed to be eligible for the requested loan, the loan is approved by the ACS system 7. The ACS system 7 then sends, at Step 215, a command message to the charging system 9 to update the balance in the requesting user's main account 22*a*, 22*b* (contained in the main account data store 21). Upon receiving this command message, the charging system 9 implements, at Step 220, the required update in the corresponding user account 22*a*, 22*b*. Subsequently, the ACS system 7 sends, at Step 225, a confirmatory notification message to the requesting user 1 to confirm that their loan request has been approved, and that the appropriate airtime credit will now be available in their account 22*a*, 22*b* for them to utilise for airtime services.

The subsequent loan recovery process 300 shown in FIG. 3 is also carried out using the system of FIG. 1 and begins, at Step 305, when the customer 1*a* purchases an airtime recharge lop-up' amount from the recharge merchant 5. As part of the transaction, the user is provided with recharge details, which include a unique identifier associated with the purchased recharge. These recharge details are provided, via the communications network 11, as a recharge request by the customer 1*a*, at Step 310, to the charging system 9. The charging system subsequently ascertains, at Step 315, whether the requested recharge is valid (i.e. checks that the requested recharge amount was validly obtained). In an example embodiment, the recharge merchant 5 may comprise a recharge outlet or street vendor, from which the customer 1*a* may purchase a prepaid recharge scratch card. The customer 1*a* can scratch the card to obtain a unique identifying number associated with the recharge purchase; this identifying number can be sent by the customer 1*a* to the charging system 9 using one of the mobile telecommunications devices 1*b*, 1*c* (for example, in a text message) as a machine-readable confirmation of payment of recharge funds by the user. Alternatively, the recharge merchant 5 may operate an automated mechanism of loading the purchased airtime recharge directly to the charging system 9 through a mobile command (e.g. via a USSD service).

Once the charging system 9 has ascertained the validity of the requested recharge amount, the recharge processor 23 updates, at Step 320, the balance of the corresponding user's account 22*a*, 22*b* to credit the recharge to that user account. The charging system 9 then generates, at Step 325, a recharge record reflecting the successful recharge, and transmits this recharge record to the ACS system 7.

Receipt of each recharge record from the charging system 9 triggers the ACS system 7 to carry out a check, at Step 330, as to whether the associated customer 1*a* in question has any outstanding loans; this check can be carried out by the loan engine processor 17 querying the loan database 19 and assessing the content of the appropriate user account 20*a*, 20*b*. If no outstanding loans are found to be associated with that customer 1*a*, there is, of course, no loan recovery to carry out and the processing in this respect is considered to be complete. The ACS system 7 may then discard, at Step 335, the recharge record, or simply take no further action in response.

However, if the customer 1*a* is determined by the ACS system 7 to have one or more outstanding loans associated with their account, the loan engine processor 17 calculates, at Step 340, the recoverable loan amount based on the recharge amount indicated in the recharge record. A command is then sent by the ACS system 7 to the charging system 9, instructing the latter entity to deduct the calculated recoverable loan amount from the airtime credit associated with the user's main account 22a, 22b.

Upon receiving the command from the ACS system 7, the charging system 9 attempts, at Step 345, to execute the command on the user's main account 22a, 22b. Specifically, if the balance of the corresponding user account 22a, 22b is greater than or equal to the calculated recoverable loan amount, the charging system 9 reduces the balance of airtime credit in that account by the corresponding amount, as instructed by the ACS system 7. Once this has been done, the charging system 9 transmits a confirmation to the ACS system 7 that the recoverable loan amount has been successfully recovered. The ACS system 7 then updates, at Step 350, the loan account record in the loan database 19 associated with that user to reflect the recovered loan amount. If it is not possible for the charging system 9 to recover the entire loan amount using the recharge amount (i.e. the balance in the user account 22a, 22b is less than the recoverable loan amount that has been instructed to be debited), a partial loan recovery will still be attempted by the charging system 9—i.e. the charging system 9 will attempt to recover as much as possible of the outstanding loan amount from the remaining recharge amount available, and will confirm the partially recovered amount to the ACS system 7. Alternatively, if there is no recharge amount remaining when the loan recovery process is attempted, then of course no loan recovery can be carried out; the charging system 9 will then respond to the ACS system 7 with a notification that loan recovery was not possible.

There are, however, challenges associated with this conventional approach to loan provision and recovery. To begin with, as the receipt of a recharge record is used by the ACS system 7 to trigger the loan recovery process, this inherently results in an associated time lag between the recharge being approved and implemented, and the loan recovery being carried out. A typical time lag between recharge amount provision and loan recovery instigation is on the order of several minutes (e.g. between 2 and 15 minutes). Whilst this may not seem like a particularly long time, even a few minutes of time lag can translate into a substantial amount of airtime usage. For example, if the user 1 places an International call as soon as the recharge has been approved and the recharge amount enters their account, they will use up a large amount of the airtime credit associated with the recharge amount because such calls are expensive. This, in turn, means that it is possible for the most or all of the recharge amount to be spent by the user 1 on airtime services before the funds can be used to pay off the loan; it is therefore not possible to guarantee that the recharge amount will go towards loan payoff or that there will be enough recharge funds available to settle the outstanding loan, which is of course undesirable.

In addition, it will be appreciated that the above-described processing and computation of the recoverable loan amount involves the transmission of multiple different messages and commands back and forward between the ACS system 7 and the charging system 9, making the entire process time-consuming and computationally-intensive. This is certainly more evident when the actual number of users of the system are considered, which are typically in the millions. Furthermore, every recharge record generated by the charging system 9 is analysed by the ACS system 7 in order to ascertain whether that recharge record corresponds to a user account having an outstanding loan associated with it. This further increases the processing load on the loan engine processor 17 of the ACS system 7.

The present Applicant has considered these challenges and has developed an improved mechanism for handling airtime-on-credit services, as will now be described with reference to FIGS. 4 to 6.

Figure 4:
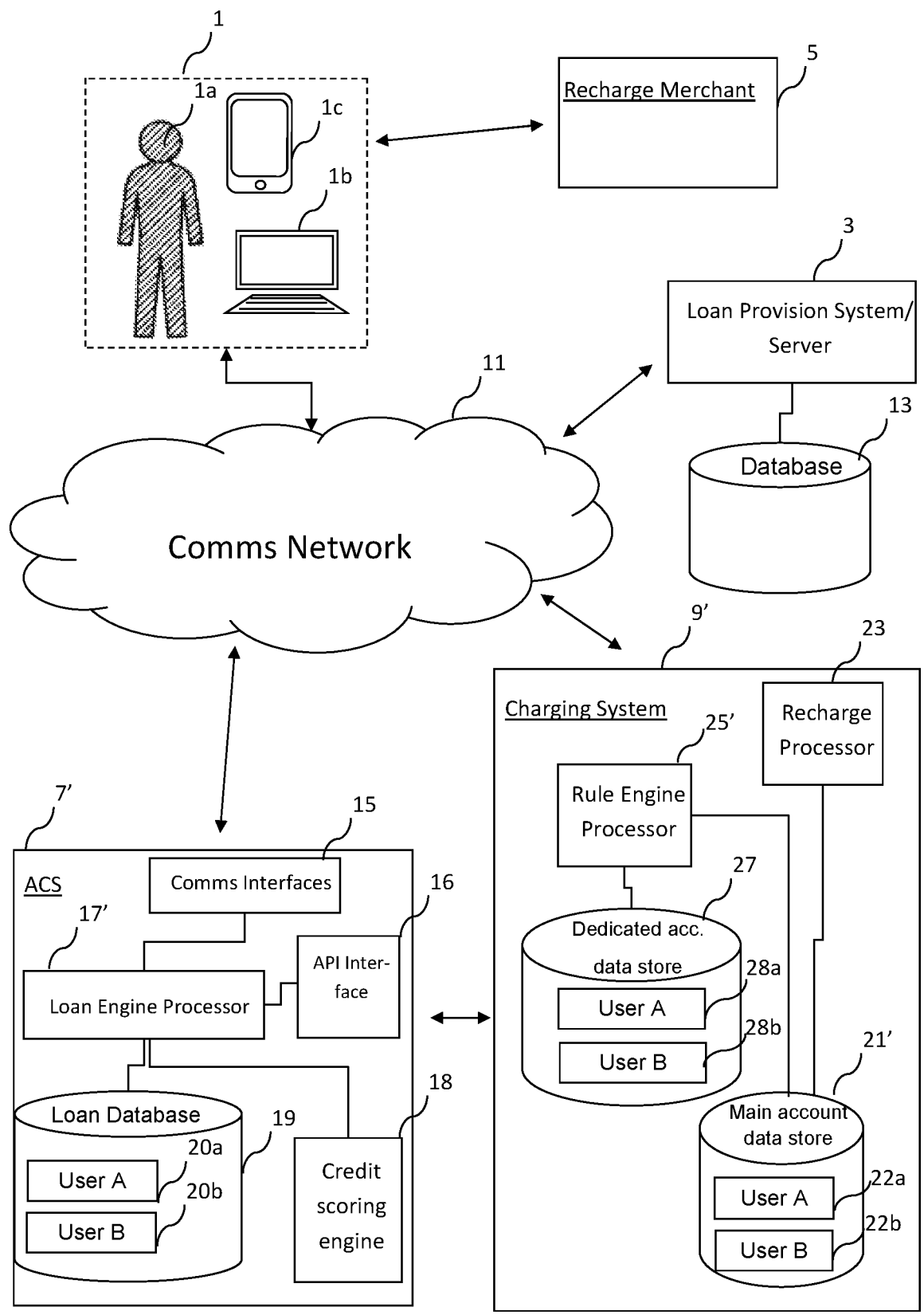
FIG. 4 is a schematic block diagram showing a system for providing an Airtime-on-Credit service according to an embodiment.

FIG. 4 illustrates a system for providing airtime-on-credit services according to an embodiment of the present invention. As will be appreciated, this system comprises all of the same main computing entities that were described in relation to FIG. 1, namely the user 1, loan provision system/server 3, recharge merchant 5, ACS system 7' and charging system 9', as well as a wide-area communications network 11 facilitating communications between these entities. The user 1, the loan provision system 3 and the recharge merchant 5 of FIG. 4, as well as the actions carried out by these entities, are substantially the same as were described for those entities in relation to FIG. 1; these entities will therefore not be discussed in any further detail here. The subsequent description will instead focus on the differences in implementation of the ACS system 7' and the charging system 9', and the associated differences in the loan provision and loan recovery processes that are carried out by these entities.

In the system of FIG. 4, the ACS system 7' comprises a communications interface 15, loan engine processor 17' and an associated loan database 19; all of these are generally similar to the corresponding components of the conventional ACS system 7. However, the rules and processing logic that is implemented by the loan engine processor 17' in combination with the other components differs from that implemented by the loan engine processor 17 in the conventional system of FIG. 1. This will be explained in greater detail subsequently.

In the system of FIG. 4, the charging system 9' comprises a main (airtime use) account data store 21', a recharge processor 23 and a rule engine processor 25', which are also similar to the corresponding components described in relation to FIG. 1. However, the charging system 9' additionally comprises another data store—a 'dedicated account' data store 27—which is associated with the rule engine processor 25', but not with the recharge processor 23. The two data stores 21', 27 are operatively separate from one another and provide different functionality.

As was previously described in relation to FIG. 1, the main account data store 21' of FIG. 4 contains user accounts 22a, 22b (i.e. the 'main accounts' or 'airtime use accounts'), and the balance of a user's account (i.e. the airtime account balance) is updated by the recharge processor 23 with airtime credit when that user purchases a recharge top-up from the recharge merchant 5 and this event is communicated to the charging system 9'. The dedicated account data store 27 also contains user accounts 28a, 28b for tracking airtime credit balances of customers 1a, but the balance of the user accounts 28a, 28b in the dedicated account data store 27 is updated based on successful loan provision to that user. In other words, the balance of airtime credit in user accounts 22a, 22b contained in the main account data store 21' is increased by purchase of recharge amounts; the balance of airtime credit in user accounts 28a, 28b contained in the dedicated account data store 27 is increased by provision of successful loans from the ACS system 7'. Furthermore, when the user 1 attempts to utilise the airtime credit associated with the provided loan, this credit is deducted from the airtime credit balance of the corresponding user account in the dedicated account data store 27. In order to ensure that the user account balances in the two data stores 21', 27 are updated correctly, the rules and processing logic of the rule engine processor 25' will differ accordingly from that of the corresponding component in the conventional system of FIG. 1.

Figure 5:
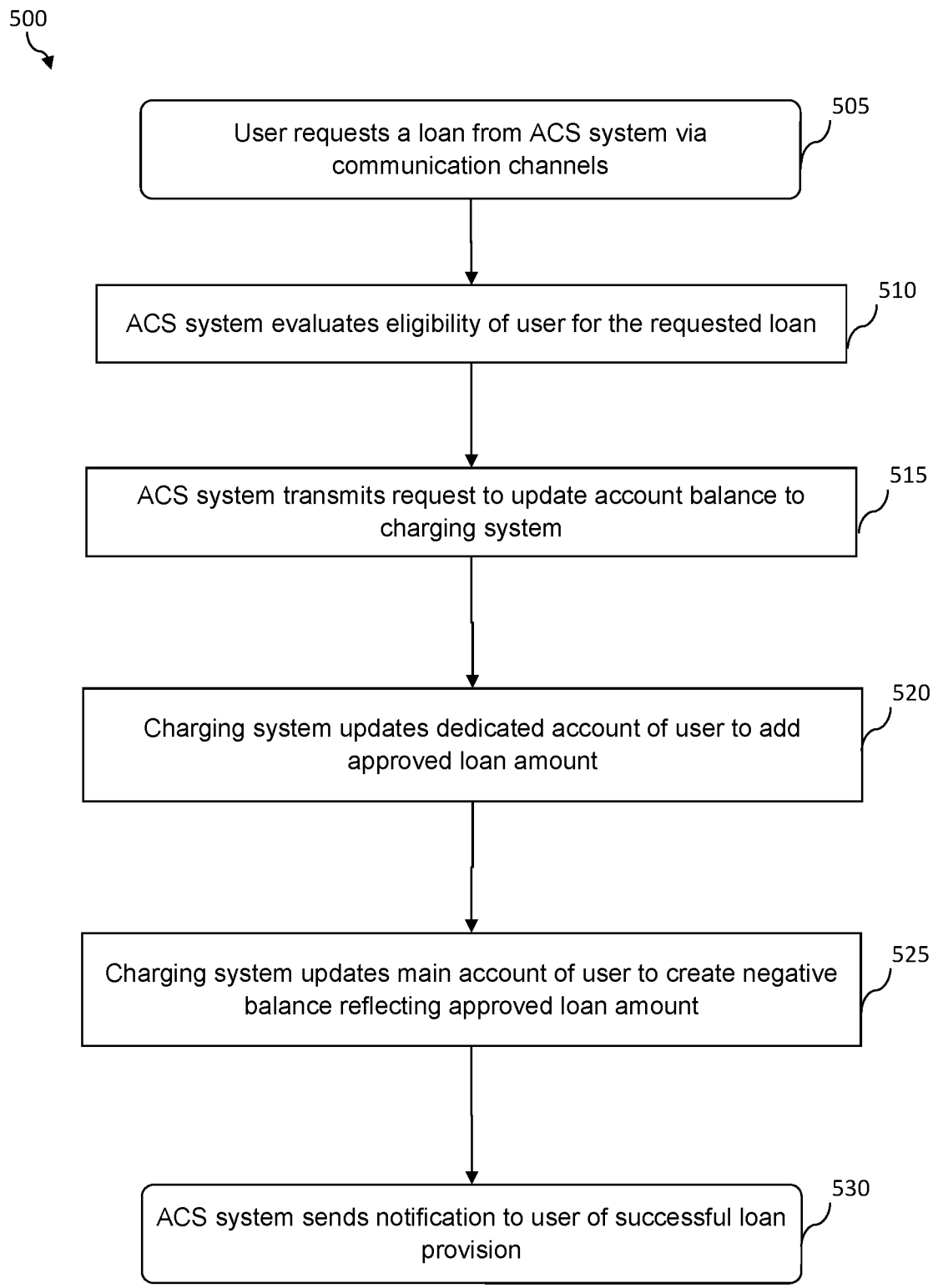
FIG. 5 is a flowchart illustrating a method for providing a loan to a requesting user using the system of FIG. 4.

FIG. 5 describes a loan provision process according to an embodiment of the present invention, implemented using the system illustrated in FIG. 4. As with the process 200 carried out by the system of FIG. 1, the loan provision process 500 begins with the customer 1a requesting a loan from the ACS system 7' via one of a variety of communication channels, and may involve use of one of their associated mobile telecommunications devices 1b, 1c. Steps 505, 510 and 515 of the loan provision process 500 involving approval of the requested loan are therefore carried out in the same manner as Steps 205, 210 and 215 of the loan provision process 200 implemented on the system of FIG. 1; the reader is therefore referred to the previous description in that regard for further details of Steps 505 to 515.

Following the transmission, at Step 515, of details of the approved loan to the charging system 9' from the ACS system 7', the charging system 9' updates, at Step 520, the balance of the corresponding user account 28a, 28b in the dedicated account data store 27 with an airtime credit amount corresponding to the granted loan amount. This credited airtime is thereafter accessible to the user 1 wishing to utilise airtime services. For example, the loan amount in the user account 28a, 28b may be associated with a digital wallet application provided in one of the user's mobile telecommunications devices 1b, 1c; the user 1 may then use this digital wallet to make payments, which could even be carried out using contactless technology. In this regard whilst the loan amount is envisaged primarily for airtime services, it can also be used for other purposes for example where a digital wallet can be used, whether this be via a near field device (NFC) sensor or via a web interface. Alternatively, airtime service providers may deduct the requisite airtime credit from the user account 28a, 28b when the user 1 makes use of airtime services. The dedicated account data store 27 is configured to allow use of airtime credit for a variety of airtime services, including voice calls, SMS, Call Ring Back Tone (CRBT), mobile data usage, internet bundle subscriptions, certain mobile provider service subscriptions, international calls, and off-network calls.

Subsequently, the charging system 9' also updates, at Step 525, the balance of the corresponding user account 22a, 22b in the main account data store 21' based on the granted loan amount. Specifically, the airtime balance in the appropriate user account is updated to reflect a 'negative balance' substantially corresponding to the granted loan amount; in practice, this negative amount is usually slightly greater than the actual granted loan amount to cover any additional service fee(s) that may be associated with the processing of the loan and its subsequent recovery. It is noted that such service fees are automatically associated with any given loan request and are added to the total owed amount upon provision of the loan funds to the user; the user must therefore pay off the combined sum of loan amount and service fees in order to be considered to have paid off their loan. These service fees also apply equally in the conventional systems and methods described earlier in relation to FIGS. 1 to 3. Once the balances of the corresponding user accounts in each of the two data stores 21', 27 have been updated in the appropriate manner by the charging system 9', a confirmation of successful loan account update is returned to the ACS system 7'. Subsequently, the user is notified, at Step 530, by the ACS system 7' that the loan has been approved and the requested airtime credit is available for use. It is to be appreciated that a negative balance in the main account does not necessarily mean that no airtime services can be provided. Rather, this depends on the threshold set for the account which may be negative, as is described later.

Figure 6:
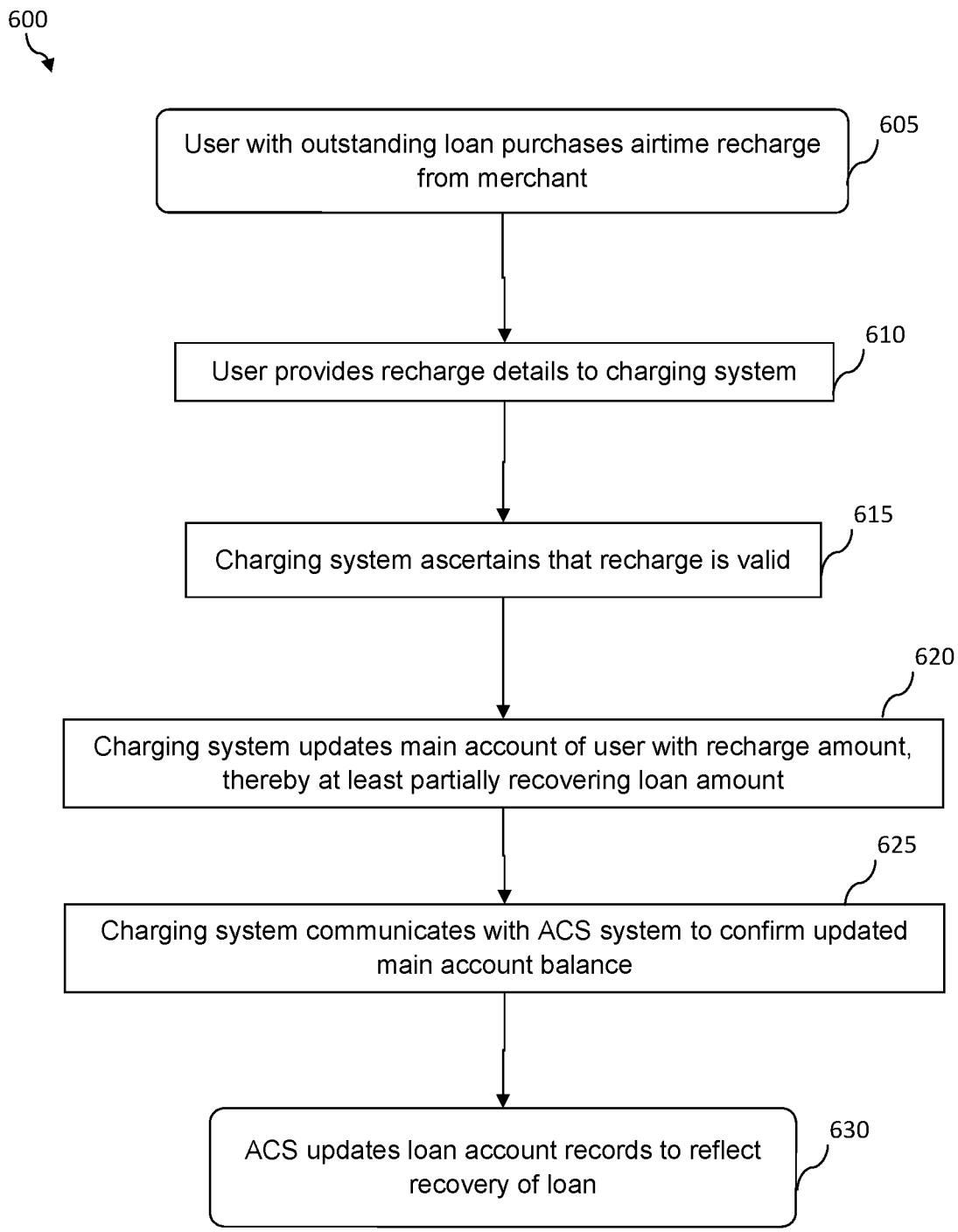
FIG. 6 is a flowchart illustrating a method for loan recovery using the system of FIG. 4.

FIG. 6 describes a loan recovery process 600 according to the embodiment of the invention and implemented using the system illustrated in FIG. 4. As with the loan recovery process 300 implemented using the conventional system of FIG. 1, the loan recovery process 600 is only carried out once the user has performed a successful recharge of airtime credit. Steps 605, 610 and 615 in this process—the steps of purchasing a recharge, providing recharge details to the charging system 9' and subsequent validation of the recharge by the charging system 9'—are carried out in the same manner as the corresponding Steps 305, 310 and 315 of the conventional process 300. As before, the reader is therefore referred to the previously-provided description of these steps for further details.

Once the recharge is ascertained, at Step 615, to be valid, the charging system 9' updates, at Step 620, the balance of the user's account 22a, 22b in the main account data store 21' by an amount of airtime credit corresponding to the purchased recharge amount. Due to the previous introduction (during Step 525 of loan provision process 500) of a 'negative balance' amount into that user account 22a, 22b, the update performed by the charging system 9', at Step 620, naturally results in the recharge amount being used to offset the 'negative balance'. In other words, as soon as the recharge amount enters the user account 22a, 22b in the main account data store 21', it is automatically and substantially immediately used for loan recovery purposes. The new airtime credit balance in the user account will therefore correspond to the difference (if any) between the recharge amount and the previous 'negative balance'.

Subsequently, the charging system 9' generates a recharge record to confirm that a recharge has been carried out, and transmits, at Step 625, this record to the ACS system 7'. Since the loan recovery process has already been automatically effected by the charging system 9', upon receiving the recharge record, the ACS system 7' only needs to update the loan record associated with the corresponding user account 20a, 20b in the loan database 19 based on the recharge amount indicated in the recharge record.

For ease of understanding of the above-described concepts, an illustrative example will now be provided. In this example, the user has a main account (MA) and a dedicated account (DA) having balance amounts as follows:

The user notices that their main account balance is running low and requests a loan of $10 worth of airtime credit. The ACS system 7' and loan provision service 3 have decided that a 10% service fee will apply to this loan (i.e. $1 worth of service fees). Therefore, once the loan is approved by the ACS system 7', according to the above-described method, the main account (MA) balance will be decreased by an amount equal to the combined requested loan amount ($10) plus the associated service fee ($1)—i.e. by a total of $11. The dedicated account (DA) balance will however only increase by the requested loan amount—i.e. by $10. As a result, after a successful loan provision, the account balances are as follows:

MA=−$10.95 and DA=$10.

The user is hence provided with the requested $10 worth of airtime credit in their dedicated account (DA), which they can use for airtime services; the main account (MA) also exhibits a 'negative balance' to reflect the corresponding combined loan amount plus service fee.

The user then makes an International call that requires $5 worth of airtime credit. Here it is to be appreciated that the amount present in the dedicated account can be used to fund the call as it is a positive amount. If the dedicated account runs down to zero and the main account is negative, then with the threshold set at zero, no further credit would be available for the user to use. Returning to this example, afterwards, the account balances are as follows:

MA=−$10.95 and DA=$5.

Subsequently, the user may carry out a recharge of $15 worth of airtime credit. According to the method descried with reference to FIG. 6, this recharge amount will immediately be directed into the main account (MA) to discharge or offset the 'negative balance' that exists and to hence achieve automatic loan recovery. The final balance of the user's accounts is therefore as follows (assuming that the user has not yet used any additional airtime credit in the meantime):

MA=$4.05 and DA=$5.

The user therefore still has $5 worth of airtime credit left in their dedicated account (DA) from their original loan. Their main account (MA) balance is also positive, indicating that the requested loan has been paid off in its entirety and that there is credit in both accounts to be used against future airtime services.

In summary, the above-described system and method effectively involves the ACS system 7' defining and implementing a minimum threshold criterion or value in relation to the user's balance in their corresponding main account. When a recharge is carried out, the recharge amount is first put towards increasing the user's main balance to try to reach the predefined minimum threshold value.

In the above illustrative example, for ease of understanding, the minimum threshold value has been defined to be zero. However, it would be possible for the threshold value to be set to a different amount as desired by the ACS system 7'. For example, a negative threshold value could be defined (e.g. −$5) so as to provide the user with promotional credit. In the above example, although the final balance in the main account would still be $4.05, the user would effectively have a total of $9.05 of airtime credit available in their main account after the $15 recharge was carried out. Alternatively, a positive threshold value could be set (for example, if a particular user has a poor repayment history). It would also be appreciated that the threshold value may be varied as desired by the ACS system 7'—i.e. the threshold value could be changed from zero to −$5 for a brief period of time, or as an initial 'welcome' offer, and then subsequently reset back to zero (i.e. once the promotion is over).

As will be appreciated, the above-described loan processing steps carried out in embodiments of the present invention have multiple advantages associated with them. To begin with, the loan recovery process is automatic and effectively implemented immediately following a successful airtime recharge. Not only does this mean that there is minimal time delay between a successful recharge and loan recovery, thereby allowing for quicker and more efficient loan recovery; it also means that the system can ensure that a specific sequence of events is always carried out in a desired order. Namely, a recharge request is always followed directly by loan recovery, and there is no possibility of the recharge amount being used first for airtime services before loan recovery can be carried out. This is because the time gap between the two events of providing a recharge amount to the airtime system and the recovery of a loan amount to the ACS system is reduced to zero.

Furthermore, due to the automated loan recovery process, fewer calculations need to be carried out by the ACS system 7' or the charging system 9' to ascertain the degree to which the recharge amount can be used to offset the outstanding airtime loan amount. As a result, fewer electronic messages and commands need to be exchanged between the ACS system 7' and the charging system 9', which reduces the data traffic and processing load on these two entities. The overall system therefore functions more efficiently and quickly. For example, the automatic and effectively instant nature of the loan recovery obviates the need to carry out other actions such as Call Data Record (CDR) or Event Data Record (EDR) processing. However, the introduction of the minimum threshold value (in the form of the 'negative balance') is done in such a way that there is no/minimal impact to existing services that are provided by the ACS system 7' and the charging system 9'—for example, it cannot allow free calls or negative amount fraud.

It is to be appreciated that in the above embodiment the term 'account' is considered to be a reference to an account file in a data store. This may in some embodiments be a database record.

Many modifications may be made to the above examples without departing from the spirit and scope of the present invention as defined in the accompanying claims.

For example, in addition to handling airtime loan provision and recovery, the ACS system 7' and charging system 9' may be configured in another embodiment, to notify the customer 1a when the balance of airtime credit present in their main (airtime) account 22a, 22b is low (for example, below a predefined threshold), thereby allowing the customer 1a to take the necessary action to request an airtime loan. In this case, upon receiving the notification, the user may be provided with the option to carry out a 'single-click' request (for example, via a selectable button that is associated with the low balance notification). In other examples, the customer 1a may instead request an airtime loan via any one or more of the following on-demand mechanisms: Short Message Service (SMS); Unstructured Supplementary Service Data (USSD); Interactive Voice Response (IVR); a web interface through a web browser.

Alternatively, in another embodiment, an automatic subscription for airtime credit loans may be set up by the user. For example, the ACS system 7' and charging system 9' may be configured to determine when the balance in the user accounts 22a, 22b (in the main account data store) falls below a predefined threshold, whereupon automatic processing of an airtime loan will be carried out by the ACS system 7' and the charging system 9' without the user 1 having to request such a loan. The ACS system 7' and charging system 9' thereby provide a mechanism for continuously monitoring the user's airtime credit balance so as to identify when the user has reached the minimum balance; an airtime loan may be automatically requested (the user's eligibility processed) and the user's airtime credit subsequently automatically increased. The user will therefore always have access to airtime to use as and when desired.

It will be appreciated that the recharge amount used to offset the loan amount need not actually have been purchased by the customer 1a themselves; instead, the recharge amount could have been purchased for that customer 1a by another subscriber (for example, one family member purchasing a recharge of airtime credit for another family member).

In some embodiments, the ACS system 7' may also provide a web interface via which the customer is able to monitor the airtime-on-credit services. In such embodiments, details of the user's account 20a, 20b stored in the loan database 19 can be made accessible to the user (for example, via an application or web portal that the customer 1a accesses via one of their mobile telecommunications devices 1b, 1c). The user can therefore check their outstanding loan amounts (if any), their loan amount usage history, their loan and repayment history, as well as their transaction history; the balances of the user's corresponding airtime and dedicated accounts can also be displayed or otherwise provided to the user. Alternatively, the required information can be provided to the user via a messaging service (e.g. SMS, USSD) or via other similar communications mechanisms.

In some embodiments, the rules engine processor is programmed with instructions which when executed cause the rules engine processor to decrease the airtime account balance of the airtime use account file by more than the requested loan amount. This advantageously ensures that not only is the loan amount automatically repaid upon a successful recharge/top-up, but also that any service charges associated with processing the loan (and which are automatically incurred upon receiving the loan) are also automatically recovered.

In some embodiments, the predefined balance threshold of the airtime account balance is defined to be zero, such that after the rules engine processor has decreased the airtime account balance, the airtime account balance is negative. The balance threshold associated with the airtime account balance reflects the baseline credit status of the account: the user is in debt (i.e. has a loan repayment outstanding) if the airtime account balance is less than this threshold, and in credit (i.e. all loans paid off) if the airtime account balance is above this threshold. Having a predefined threshold set to zero advantageously improves the ease with which the loan repayment progress may be tracked—a negative account balance value indicates an outstanding loan associated with that user's account.

In some embodiments, the predefined balance threshold of the airtime account balance is defined to be a negative value. It is noted that the balance threshold may be configurable, either temporarily or permanently, for any given user's account; in other words, the threshold may be set to a positive or negative value instead of being set to zero. The use of a negative (or lower) balance threshold allows for promotional credit to be associated with the user's airtime account if so desired. However, as the airtime account is functionally separate from the dedicated account (which the user accesses to make use of their loan funds), this avoids potential negative amount fraud by the user.

In some embodiments, the charging system further comprises a recharge processor programmed with instructions which when executed cause the recharge processor to, in response to receiving an instruction from a recharging device, increase the amount of the airtime account balance by a specified (recharge) amount. In some embodiments, the instructions further cause the rules engine processor to send a message to a loan providing system indicating that at least a proportion of a loan amount corresponding to the specified amount has been repaid.

The advantages associated with the separation in functionality between dedicated and airtime user accounts are further highlighted here, as the recharge amount simply needs to be added to the airtime account balance, in order to automatically offset and repay some or all of the outstanding loan amount. There is no time lag between recharge approval and loan repayment when using the above-described system—no recharge record needs to be generated and used to trigger a loan recovery process. Furthermore, since the recharge amount is automatically used to discharge the loan amount as a matter of priority, there is no need to carry out any calculations of recoverable loan amounts. Overall, this has the advantages of reducing the number of communications transmitted between components within and outside of the system, as well as the associated processing and analysis load.

In some embodiments, the charging system comprises a first data store configured to store the airtime use account file; and a second data store configured to store the dedicated account file. Advantageously, the presence of separate first and second data stores to store the dedicated and airtime user accounts respectively increases the ease of separation of the functionality of the two different user accounts.

In some embodiments, there is provided an airtime processing system for handling the provision of airtime credit to a user, the airtime processing system comprising: the charging system described above, and an airtime-on-credit system configured to process loans of airtime credit for provision to the user. The airtime-on-credit system comprising: a receiver configured to receive a request from the user for a loan amount; and a loan data store configured to store a loan account file associated with the user and containing airtime credit loan eligibility criteria. The airtime-on-credit system further comprises a loan engine processor programmed with instructions which when executed cause the loan engine processor to: retrieve the loan account file associated with the user from the loan data store, and analyse the eligibility criteria in the loan account file to determine if the user is eligible to receive the requested loan amount; and in response to determining that the user is eligible for the requested loan, generate and transmit a command for the rules engine processor of the charging system to update the dedicated account balance in the dedicated account file and to update the airtime account balance of the airtime use account file based on the requested loan amount.

In this example, the airtime-on-credit service system interfaces with the user: it receives requests for loans from the user, processes each request to ascertain whether the user is eligible for the loan and can notify the user accordingly. The charging system is in operative communication with the ACS system (e.g. via a backend service), and provides the storage mechanism for the user accounts, but acts under instructions from the airtime-on-credit system. Other configurations of the overall system would also be possible.

In some embodiments, the airtime processing system further comprises a credit scoring engine, wherein the instructions further cause the loan engine processor to access the credit scoring engine to analyse the eligibility criteria in the loan account file when determining if the user is eligible to receive the requested loan amount. This advantageously improves the efficiency and speed of analysing user-eligibility for the requested loans, and hence the speed with which loans may be approved. The eligibility criteria may comprise any one or more of the following: the average revenue per user (ARPU); the number of days since the date of activation of the user's account; the user's airtime recharge frequency; number and frequency of airtime loan requests and details of loan repayment associated with the user; and average loan repayment time of the user.

In some embodiments, the airtime processing system further comprises a transmitter configured to transmit a notification to the user that the loan amount is available to be debited in correspondence with use of payment services or airtime services by the user. This advantageously informs the user as soon as the loan is available for them to use.

In some embodiments, the airtime account balance has an associated predefined recharge threshold; and the rules engine processor or the loan engine processor is configured to, in response to the airtime account balance reaching the predefined recharge threshold, generate a notification message for output by the transmitter to the user that a loan may be requested.

In some embodiments, the airtime account balance has an associated predefined recharge threshold; and the instructions further cause the loan engine processor to, in response to the airtime account balance reaching the predefined recharge threshold: carry out the retrieving and analysing steps to determine if the user is eligible to receive a predefined loan amount; and if the user is eligible, carry out the step of generating and outputting the command for the rules engine processor to update the dedicated account balance and the airtime account balance with the predefined loan amount.

The above-described configurations advantageously provide an automatic mechanism for ensuring that the user does not run out of airtime credit at an inopportune moment. In the former setup, the system notifies the user that their available airtime credit is running low, so that the user has plenty of advance warning and can request a loan prior to running out of airtime credit. In the latter setup, user involvement is not necessary: the system automatically initiates the loan request process for the user, without the user having to actively input any request for a loan.

In some embodiments, the input comprises any one or more of: a USSD interface, an SMS interface, an VR interface, an API interface, or an internet communication channel.

Advantageously, the system may comprise multiple different communications channels or mechanisms which the user may make use of when requesting a loan.

In some embodiments, the transmitter is further configured to transmit to the user information relating to the airtime credit history of the user, the information comprising any one or more of the group comprising: an airtime account balance, a dedicated account balance, a transaction history, an outstanding loan amount, a loan amount usage history, a loan history, a repayment history, and a transaction history.

In some embodiments, the transmitter is configured to transmit the information to a mobile telecommunications device associated with the user via any one or more of mechanisms in the group comprising: a web interface, a graphical user interface, a messaging service, and an application installed on a mobile telecommunications device.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The invention claimed is:

1. A charging system for charging an airtime use account file associated with a user for the provision of mobile telecommunications services to the user, the charging system comprising:
one or more data stores configured to store:
the airtime use account file, the airtime use account file having an airtime account balance which is debited in correspondence with use of airtime services by the user and has an associated predefined balance threshold;
a dedicated account file associated with the user and configured to store loan funds provided to the user, the dedicated account file having a dedicated account balance which is debited in correspondence with use of payment services or airtime services by the user; and
a rules engine processor programmed with instructions which when executed cause the rules engine processor to increase the dedicated account balance in the dedicated account file by an amount corresponding to a requested loan amount, and decrease the airtime account balance of the airtime use account file by at least the requested loan amount;
wherein the rules engine processor is configured to debit the dedicated account balance with use of airtime services when the airtime account balance is at or below the threshold amount; and
wherein the predefined balance threshold of the airtime account balance is defined to be zero, such that after the rules engine processor has decreased the airtime account balance, the airtime account balance is negative.

2. The charging system of claim 1, wherein the rules engine processor is programmed with instructions which when executed cause the rules engine processor to decrease the airtime account balance of the airtime use account file by more than the requested loan amount.

3. The charging system of claim 1, wherein the predefined balance threshold of the airtime account balance is defined to be a negative value.

4. The charging system of claim 1,
further comprising a recharge processor programmed with instructions which when executed cause the recharge processor to, in response to receiving an instruction from a recharging device, increase the amount of the airtime account balance by a specified amount; and
wherein the instructions further cause the rules engine processor to send a message to a loan providing system indicating that at least a proportion of a loan amount corresponding to the specified amount has been repaid.

5. The charging system of claim 1, comprising:
a first data store configured to store the airtime use account file; and
a second data store configured to store the dedicated account file.

6. An airtime processing system for handling the provision of airtime credit to a user, the airtime processing system comprising:
the charging system of claim 1; and
an airtime-on-credit system configured to process loans of airtime credit for provision to the user, the airtime-on-credit system comprising:
a receiver configured to receive a request from the user for a loan amount;
a loan data store configured to store a loan account file associated with the user and containing airtime credit loan eligibility criteria; and
a loan engine processor programmed with instructions which when executed cause the loan engine processor to:
retrieve the loan account file associated with the user from the loan data store, and analyse the eligibility criteria in the loan account file to determine if the user is eligible to receive the requested loan amount; and in response to determining that the user is eligible for the requested loan, generate and output a command for the rules engine processor of the charging system to update the dedicated account balance in the dedicated account file and to update the airtime account balance of the airtime use account file based on the requested loan amount.

7. The airtime processing system of claim 6, further comprising a credit scoring engine and wherein the instructions further cause the loan engine processor to access the credit scoring engine to analyse the eligibility criteria in the loan account file when determining if the user is eligible to receive the requested loan amount.

8. The airtime processing system of claim 6, further comprising a transmitter configured to transmit a notification to the user that the loan amount is available to be debited in correspondence with use of payment services or airtime services by the user.

9. The airtime processing system of claim 8, wherein:
the airtime account balance has an associated predefined recharge threshold; and
wherein the rules engine processor or the loan engine processor is configured to, in response to the airtime account balance reaching the predefined recharge threshold, generate a notification message for output by the transmitter to the user that a loan may be requested.

10. The airtime processing system of claim 8, wherein the transmitter is further configured to transmit, to the user, information relating to the airtime credit history of the user, the information comprising any one or more of: an airtime account balance, a dedicated account balance, an outstanding loan amount, a loan amount usage history, a loan history, a repayment history, and a transaction history.

11. The airtime processing system of claim 10, wherein the transmitter is configured to transmit the information to a mobile telecommunications device associated with the user via any one or more of: a web interface, a graphical user interface, a messaging service, and an application installed on a mobile telecommunications device.

12. The airtime processing system of claim 6, wherein:
the airtime account balance has an associated predefined recharge threshold; and
wherein the instructions further cause the loan engine processor to, in response to the airtime account balance reaching the predefined recharge threshold:
carry out the retrieving and analysing steps to determine if the user is eligible to receive a predefined loan amount; and
if the user is eligible, carry out the step of generating and outputting the command for the rules engine processor to update the dedicated account balance and the airtime account balance with the predefined loan amount.

13. The airtime processing system of claim 6, wherein the receiver comprises any one or more of: a USSD interface, an SMS interface, an IVR interface, an API (Application Programming Interface), and an internet communication channel.

14. The airtime processing system of claim 6, wherein the payment services or airtime services correspond to any one or more of: a Call Ring Back Tone, a mobile service provider subscription, an internet bundle subscription, a value-added service, a voice call, an off-network service, an international call, a messaging service, and an electronic payment transaction via a digital wallet application.

15. A computer-implemented method of charging an airtime use account file associated with a user for the provision of mobile telecommunications services to the user, the method being implemented by a charging system comprising one or more data stores configured to store:
the airtime use account file, the airtime use account file having an airtime account balance which is debited in correspondence with use of airtime services by the user and has an associated predefined balance threshold;
a dedicated account file associated with the user and configured to store loan funds provided to the user, the dedicated account file having a dedicated account balance which is debited in correspondence with use of payment services or airtime services by the user;
the method comprising:
increasing the dedicated account balance in the dedicated account file by an amount corresponding to a requested loan amount; and
decreasing the airtime account balance of the airtime use account file by at least the requested loan amount,
the method further comprising, when the airtime account balance is at or below the balance threshold, debiting the dedicated account balance with use of airtime services by the user,
wherein the predefined balance threshold of the airtime account balance is defined to be zero, such that after decreasing the airtime account balance, the airtime account balance is negative.

16. The computer-implemented method of claim 15, wherein the decreasing step comprises decreasing the airtime account balance of the airtime use account file by more than the requested loan amount such that a service charge can be reclaimed.

17. The computer-implemented method of claim 15, wherein the predefined balance threshold of the airtime account balance is defined to be a negative value.

18. The computer-implemented method of claim 15, further comprising:
increasing the amount of the airtime account balance by a specified amount in response to receiving a recharging instruction; and
sending a message to a loan providing system indicating that at least a proportion of a loan amount corresponding to the specified amount has been repaid.

* * * * *